(12) United States Patent
Chu

(10) Patent No.: US 6,629,169 B2
(45) Date of Patent: Sep. 30, 2003

(54) APPARATUS AND METHOD FOR TESTING OF USB DEVICE

(75) Inventor: Ping-Ying Chu, Tainan (TW)

(73) Assignee: Winband Electronics Corp. (TW)

( * ) Notice: Subject to any disclaimer, the term of this patent is extended or adjusted under 35 U.S.C. 154(b) by 357 days.

(21) Appl. No.: 09/808,577

(22) Filed: Mar. 14, 2001

(65) Prior Publication Data

US 2002/0133649 A1 Sep. 19, 2002

(51) Int. Cl.[7] .............................................. G06F 13/14
(52) U.S. Cl. .............................. 710/72; 710/73; 710/63; 710/62; 710/16
(58) Field of Search .............................. 710/62–64, 73, 710/72, 8, 313, 16, 104, 36; 700/28, 32, 39

(56) References Cited

U.S. PATENT DOCUMENTS

| | | | | |
|---|---|---|---|---|
| 6,101,076 A | * | 8/2000 | Tsai et al. ..................... 361/90 |
| 6,205,502 B1 | * | 3/2001 | Endo et al. .................. 710/100 |
| 6,230,226 B1 | * | 5/2001 | Hu et al. ..................... 710/305 |
| 6,370,603 B1 | * | 4/2002 | Silverman et al. ............. 710/72 |
| 6,393,588 B1 | * | 5/2002 | Hsu et al. ...................... 714/43 |
| 6,460,094 B1 | * | 10/2002 | Hanson et al. .................. 710/8 |

* cited by examiner

Primary Examiner—Kim Huynh
(74) Attorney, Agent, or Firm—Raymond Sun

(57) ABSTRACT

A USB device is coupled to a first USB communication line and a second USB communication line. Separate first and second paths are created between an external device and a controller in the USB device, with both paths including the first and second USB communication lines. The USB device detects whether a USB connection exists over the first and second USB communication lines. If a USB connection exists over the first and second USB communication lines, USB communication is routed via the first path. Otherwise, testing communication is routed via the second path. The external device can be either a USB host or a testing unit.

16 Claims, 2 Drawing Sheets

APPARATUS AND METHOD FOR TESTING OF USB DEVICE

BACKGROUND OF THE INVENTION

1. Field of the Invention

The present invention relates generally to an apparatus and method for the testing of a USB device, and in particular, to a USB device whose USB communication ports can also be used for testing of the USB device.

2. Background Art

USB is commonly used to interface data communications or connections between a host or hub (such as a personal computer (PC)) and peripheral devices (such as printers and scanners, among others). FIG. 1 is a simple schematic diagram illustrating a conventional USB device 10, such as a scanner, and how the USB device 10 is tested by the manufacturer of the USB device 10 prior to delivery of the USB device 10 to a customer.

The USB device 10 has an integrated circuit (IC) 12. Any conventional IC can be utilized, but in many cases, the IC can be a conventional ASIC as is well-known in the art. The IC 12 is coupled to a motor 14 to control the operation of the motor 14. In addition, the IC 12 is coupled to a sensor 16, which can be CCD sensor. The sensor 16 is utilized by the scanner 10 to scan documents, as is well-known in the art, and the signals representing the scanned information are provided to the IC 12 for processing.

Although the USB device 10 is being described herein as being a scanner, the principles of the present invention are equally applicable to any device or peripheral which has the capability for USB communication with a host device. Such devices and peripherals include keyboards, computer mice, printers, monitors, etc. In most cases, the host device would be a PC, which operates in conjunction with an operating system such as "Windows"™ to issue a series of commands to the USB device 10 to control the operation of the USB device 10. As a result, each USB device 10 requires one corresponding PC to enable the USB device 10 to be operated.

The testing of a USB device 10 usually includes a conventional burn-in test as is well-known in the art. FIG. 1 illustrates a testing unit 20 that has a processor 22 that is coupled via conventional USB lines (D+, D−) to the IC 12 to perform the testing. The processor 22 is typically a PC operating in a "Windows"™ operating system (such as Windows 98). However, since each USB device 10 needs to be separately controlled by a dedicated PC, the manufacturer of the USB device 10 will need to have on hand a large number of PCs to perform testing. For example, a scanner manufacturer may need to utilize up to a few hundred PCs. Since each burn-in test can take up to three hours to complete for each USB device 10, the testing becomes cumbersome, time-consuming, and therefore quite expensive. As a result, many USB devices 10 are not tested prior to release.

To overcome this problem, some manufacturers have attempted to use smaller and less complex processors instead of an entire PC system to perform the testing. These smaller processors are less expensive than a conventional PC system because they omit many of the components (e.g., certain boards, cards, etc.) of a PC, and do not need to be supported by a "Windows"™ operating system. As a result, the manufacturer may be able to afford to hook up a few hundred smaller processors at any given time to perform the needed testing for the USB devices 10. One example of such a smaller processor is an MCU 8051, manufactured and sold by Intel Corporation, which is well-known in the art. To use the 8051, the USB device 10 would have two dedicated testing ports (such as an 12C protocol bus) that are only used for testing purposes. These testing ports are usually pins and connectors that are typically provided on the IC 12, and the processor would issue commands to the IC 12 via these testing ports to perform the testing procedures. Unfortunately, these dedicated testing ports cannot be used during the normal use and operation of the USB device 10. These open ports are often aesthetically unpleasant, and are often not tolerated by consumers. In addition, these open testing ports use up precious space on an IC 12, and increase the complexity of the design of the IC 12.

Thus, there still remains a need for an apparatus and method for testing USB devices that avoid the above-mentioned problems.

SUMMARY OF THE INVENTION

It is an object of the present invention to provide an IC and method for use in a USB device that does not need to be tested by PCs.

It is another object of the present invention to provide an IC and method for use in a USB device that does not utilize dedicated testing ports.

It is yet another object of the present invention to provide an IC and method for use in a USB device where the same pins and connectors can be used for both testing and normal operation.

To accomplish the objectives of the present invention, there is provided an apparatus and method of testing a USB device. The present invention provides a first USB communication line and a second USB communication line. Separate first and second paths are created between an external device and a controller in the USB device, with both paths including the first and second USB communication lines. The apparatus detects whether a USB connection exists over the first and second USB communication lines. If a USB connection exists over the first and second USB communication lines, USB communication is routed via the first path. Otherwise, testing communication is routed via the second path. The external device can be either a USB host or a testing unit.

BRIEF DESCRIPTION OF THE DRAWINGS

The invention can be more fully understood by reading the subsequent detailed description of the preferred embodiments, with reference made to the accompanying drawings.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The present invention provides an IC 112 that is used in a USB device 10, with the IC 12 being programmed so that the same pins and connectors can be used for both testing and normal operation.

Figure 1:
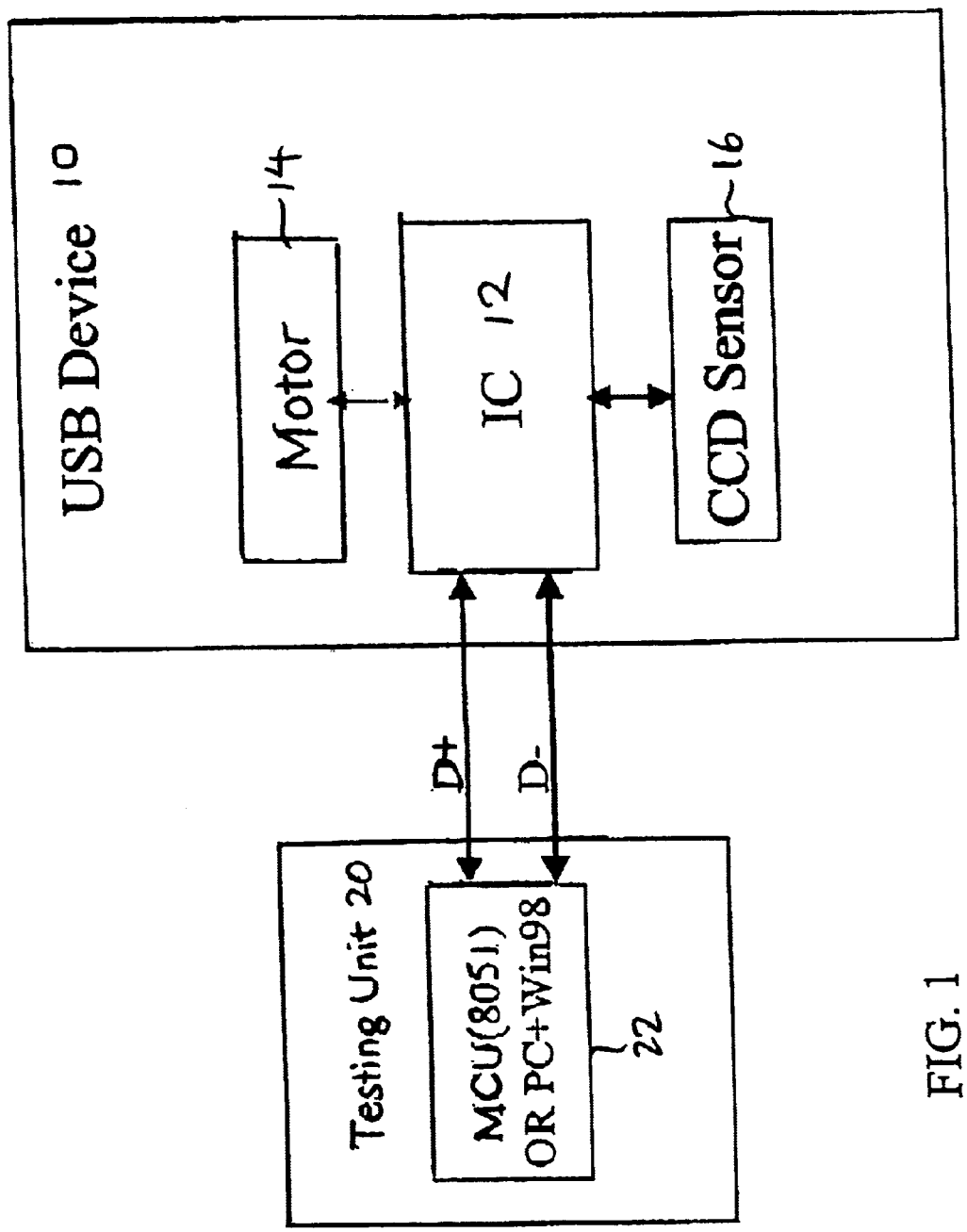
FIG. 1 is a schematic block diagram of a USB device coupled to a testing unit.
Figure 2:
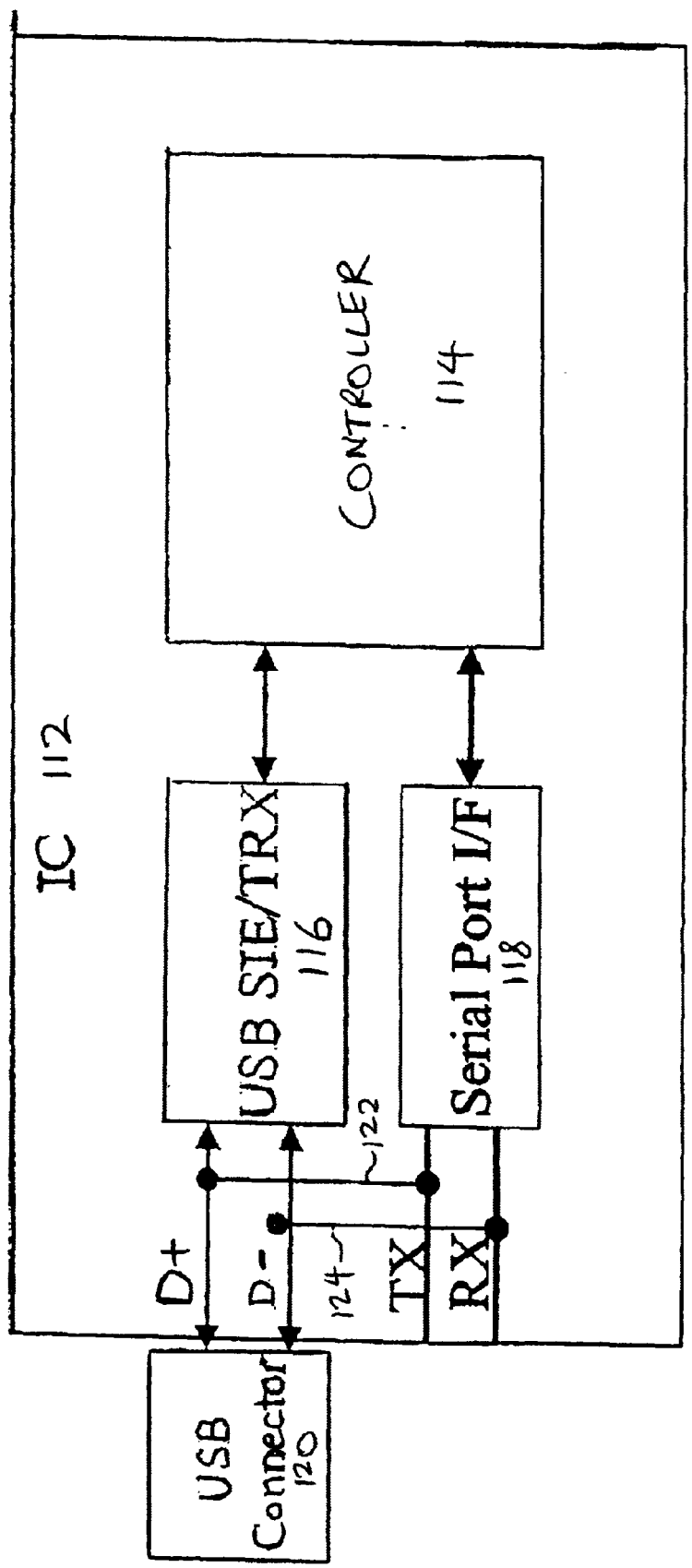
FIG. 2 is a schematic block diagram illustrating the connection of an IC for a USB device to a USB connection according to the present invention.

FIG. 2 illustrates an IC 112 according to the present invention. The IC 112 can be positioned in the USB device 10 in the same manner as the IC 12 shown in FIG. 1 (i.e., coupled to a motor 14 and a sensor 16, if the IC 112 is used in connection with a scanner), and can be embodied in the form of an ASIC on a single chip. The IC 112 has a controller 114 which can be a processor that controls the logic and operation of the entire USB device 10. One non-limiting example of a possible controller 114 can be the Winbond W6668 ASIC that is currently manufactured and sold by Winbond Electronics Corporation of Hsinchu, Taiwan.

The IC 112 also has a USB SIE/TRX function block 116 that is coupled to a connector at the controller 114, and has USB lines D+ and D− that are coupled to corresponding D+ and D− lines of a USB connector 120. As used herein, "SIE" means serial interface engine, and "TRX" means transceiver.

The IC 112 further includes another function block in the form of a Serial Port Interface (I/F) 118 that is also coupled to at the controller 114. The Serial Port I/F 118 has a transmission line TX that is coupled via line 122 to the D+ line between the USB SIE/TRX 116 and the USB connector 120, and a reception line RX that is coupled via line 124 to the D− line between the USB SIE/TRX chip and the USB connector 120.

The USB connector 120 can be any conventional USB connector, and in one non-limiting example, can be embodied in the form of either the UC1012CK0 or the UC1112CK0 that is manufactured by Foxconn of Taiwan. The USB connector 120 can be coupled to any conventional USB host (such as a PC) for use by an end-user in controlling the operation of the USB device 10 in which the IC 112 is embodied.

The IC 112 can be used for both testing of the USB device 10 and during normal use of the USB device 10. During initialization of the controller 114, the controller 114 detects whether the D+ and D− lines are connected to a USB host or hub. In particular, standard and well-known USB protocols can be used by the controller 114 to detect the existence of a USB connection. If there is a USB connection, then the controller 114 will operate in the normal USB mode, where the USB host issues commands to control the operation of the USB device 10. This exchange of USB signals between the host and the USB device 10 is accomplished via a path which includes the D+ and D− lines and the USB SIE/TRX 116.

On the other hand, if there is no USB connection, then the controller 114 will operate in the testing mode. The testing can be accomplished by connecting a processor 22 (such as the 8051 described hereinabove) from a testing unit 20 to the D+ and D− lines. The testing signals can be communicated between the processor 22 of the testing unit 20 and the IC 112 via a path which includes the D+ and D− lines and the serial port I/F 118.

As a result, the same USB lines D+ and D− can be utilized for both normal USB operation and testing. Depending on the mode of operation, the communication signals can be routed to the controller 114 via either the USB SIE/TRX 116 or the serial port I/F 118. This avoids the need for unsightly dedicated testing pins and connectors, while allowing for the use of the less expensive processors (e.g., the 8051) during testing. Another benefit that is realized by the present invention is that an 12C protocol bus is not needed to operate the IC 112 of the present invention, in that any bus having two lines will suffice.

The USB SIE/TRX 116 and the serial port I/F 118 can be provided as part of the controller 114 in a single chip (such as an ASIC), or each can be provided separately from the controller 114 on the printed circuit board (PCB) that carries the IC 112 or the controller 114.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A USB device, comprising:
   a first USB communication line and a second USB communication line, each having a first end coupling a USB connector, and a second end;
   a controller;
   a serial interface engine transceiver (USB SIE/TRX) coupled between the controller and the first and second USB communication lines; and
   a serial port interface coupled between the controller and the first and second USB communication lines.

2. The device of claim 1, wherein the USB SIE/TRX is coupled between the controller and the second ends of the first and second USB communication lines.

3. The device of claim 1, further including first and second testing lines, with each of the testing lines coupled to the serial port interface and one of the USB communication lines.

4. A USB device, comprising:
   a first USB communication line and a second USB communication line, each having a first end coupling a USB connector, and a second end;
   a controller;
   a first port coupled between the controller and the first and second USB communication lines; and
   a second port coupled between the controller and the first and second USB communication lines.

5. The device of claim 4, wherein the first port is coupled between the controller and the second ends of the first and second USB communication lines.

6. The device of claim 4, further including first and second testing lines, with each of the testing lines coupled to the second port and one of the USB communication lines.

7. The device of claim 4, wherein the first port is a transceiver.

8. The device of claim 4, wherein the second port is a serial port interface.

9. A system, comprising:
   a USB host;
   a USB connector connected to the USB host;
   a USB device having:
      a first USB communication line and a second USB communication line, each having a first end coupling the USB connector, and a second end;
      a controller;
      a first port coupled between the controller and the first and second USB communication lines; and
      a second port coupled between the controller and the first and second USB communication lines.

10. The device of claim 9, wherein the first port is coupled between the controller and the second ends of the first and second USB communication lines.

11. The device of claim 9, further including first and second testing lines, with each of the testing lines coupled to the second port and one of the USB communication lines.

12. The device of claim 9, wherein the first port is a transceiver.

13. The device of claim 9, wherein the second port is a serial port interface.

14. A method of testing a USB device, comprising:

providing a first USB communication line and a second USB communication line;

providing a first path between a first external device and a controller in the USB device, the first path including the first and second USB communication lines;

providing a second path between a second external device and a controller in the USB device, the second path being different from the first path and including the first and second USB communication lines;

detecting whether a USB connection exists over the first and second USB communication lines;

routing USB communication via the first path if a USB connection exists over the first and second USB communication lines; and routing testing communication via the second path if a USB connection exists over the first and second USB communication lines.

15. The method of 14, wherein the second external device is a testing unit.

16. The method of 14, wherein the first external device is a USB host.

* * * * *